(12) United States Patent
Feng et al.

(10) Patent No.: US 7,836,343 B2
(45) Date of Patent: Nov. 16, 2010

(54) METHOD AND APPARATUS FOR REDUCING TEST CASE GENERATION TIME IN PROCESSOR TESTING

(75) Inventors: Guo H. Feng, Austin, TX (US); Pedro Martin-de-Nicolas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/041,071

(22) Filed: Mar. 3, 2008

(65) Prior Publication Data

US 2009/0222647 A1    Sep. 3, 2009

(51) Int. Cl.
*G06F 11/00*   (2006.01)
(52) U.S. Cl. .......................... 714/32; 714/741; 714/38; 714/708; 714/701; 714/738; 714/739; 714/740; 714/742; 717/134; 717/135; 717/138
(58) Field of Classification Search ................. 714/32, 714/38, 701, 738–742; 717/135, 138; 379/10.01
See application file for complete search history.

(56) References Cited

U.S. PATENT DOCUMENTS

| | | | | |
|---|---|---|---|---|
| 5,130,936 A | * | 7/1992 | Sheppard et al. | 702/123 |
| 5,193,178 A | * | 3/1993 | Chillarege et al. | 714/25 |
| 5,371,883 A | * | 12/1994 | Gross et al. | 714/38 |
| 5,412,801 A | * | 5/1995 | de Remer et al. | 714/20 |
| 5,557,539 A | * | 9/1996 | Fitch | 709/206 |
| 5,671,351 A | * | 9/1997 | Wild et al. | 714/38 |
| 5,673,387 A | * | 9/1997 | Chen et al. | 714/38 |
| 5,729,554 A | * | 3/1998 | Weir et al. | 714/739 |
| 5,740,353 A | * | 4/1998 | Kreulen et al. | 714/42 |
| 5,751,941 A | * | 5/1998 | Hinds et al. | 714/38 |
| 5,831,998 A | * | 11/1998 | Ozmizrak | 714/741 |
| 5,892,947 A | * | 4/1999 | DeLong et al. | 717/100 |
| 5,960,457 A | * | 9/1999 | Skrovan et al. | 711/146 |
| 6,011,830 A | * | 1/2000 | Sasin et al. | 379/10.03 |
| 6,031,990 A | * | 2/2000 | Sivakumar et al. | 717/124 |
| 6,088,690 A | * | 7/2000 | Gounares et al. | 706/13 |
| 6,148,427 A | * | 11/2000 | Sherwood et al. | 714/738 |
| 6,219,829 B1 | * | 4/2001 | Sivakumar et al. | 717/131 |
| 6,279,124 B1 | * | 8/2001 | Brouwer et al. | 714/38 |
| 6,715,108 B1 | * | 3/2004 | Badger et al. | 714/38 |
| 7,356,436 B2 | * | 4/2008 | Bohizic et al. | 702/119 |

(Continued)

*Primary Examiner*—Robert Beausoliel
*Assistant Examiner*—Jeison C Arcos
(74) *Attorney, Agent, or Firm*—Yee & Associates, P.C.; Matthew W. Baca

(57) ABSTRACT

A method, apparatus and computer program product are provided for use in a system that includes one or more processors, and multiple threads that are respectively associated with the one or more processors. One embodiment of the invention is directed to a method that includes the steps of generating one or more test cases, wherein each test case comprises a specified set of instructions in a specified order, and defining a plurality of thread hardware allocations, each corresponding to a different one of the threads. The thread hardware allocation corresponding to a given thread comprises a set of processor hardware resources that are allocated to the given thread for use in executing test cases. The method further includes executing a particular one of the test cases on a first thread hardware allocation, in order to provide a first set of test data, and thereafter executing the particular test case using a second thread hardware allocation, in order to provide a second set of test data.

20 Claims, 5 Drawing Sheets

U.S. PATENT DOCUMENTS

| | | |
|---|---|---|
| 7,729,891 B2 * | 6/2010 | Fine et al. ................. 703/2 |
| 2001/0052089 A1 * | 12/2001 | Gustavsson et al. ......... 714/38 |
| 2003/0018932 A1 * | 1/2003 | Blum et al. ................ 714/46 |
| 2003/0028856 A1 * | 2/2003 | Apuzzo et al. ............ 717/124 |
| 2003/0037314 A1 * | 2/2003 | Apuzzo et al. ............ 717/125 |
| 2003/0191985 A1 * | 10/2003 | Barrett .................... 714/32 |
| 2004/0025088 A1 * | 2/2004 | Avvari et al. .............. 714/38 |
| 2004/0088677 A1 * | 5/2004 | Williams ................. 717/104 |
| 2004/0181713 A1 * | 9/2004 | Lambert ................... 714/48 |
| 2005/0076282 A1 * | 4/2005 | Thompson et al. ......... 714/739 |
| 2005/0086565 A1 * | 4/2005 | Thompson et al. ......... 714/741 |
| 2005/0154939 A1 * | 7/2005 | De Pauw et al. ........... 714/25 |
| 2005/0229162 A1 * | 10/2005 | Tanner ................... 717/126 |
| 2007/0162894 A1 * | 7/2007 | Noller et al. ............. 717/124 |

* cited by examiner

METHOD AND APPARATUS FOR REDUCING TEST CASE GENERATION TIME IN PROCESSOR TESTING

BACKGROUND OF THE INVENTION

1. Field of the Invention

The invention claimed herein generally pertains to a method for reducing the time needed to generate test cases, which are provided to test processors such as microprocessors. More particularly, the invention pertains to a method of the above type wherein respective test cases, after being generated, are executed and re-executed a number of times in connection with different processor threads, in order to produce a substantial amount of test data.

2. Description of the Related Art

When a system is designed that includes a microprocessor or the like, it is important to verify and validate the system design, in order to ensure that the processor operates as intended. Accordingly, processor testing tools are used to apply stressful tests to the processor. Results of the tests are monitored, and then compared with expected or intended results produced by either the first pass of a two-pass consistency test or simulation. Typically, the testing tools include specially prepared test patterns or test cases, wherein a test case comprises a collection or set of specified processor instructions, arranged for execution in a specified order.

In microprocessor testing, test cases can be provided by a baremetal kernel, which directs or manipulates the test cases based on user specified inputs at compile time. The kernel is usually composed of the following four basic tasks or routines: initialization; test case generation; test case execution; and test results verification. Initialization is done one time, while the test case generation, execution and results verification tasks are continually looped around through the processor. This will continue until the user stops the run, or a fault or failure is detected.

In test procedures of the type described above, generating or building the test cases is typically the task that is most time consuming. As complexity of the kernel generation code increases, the portion of the time of the under-test processor cycle that is devoted to the generation routine likewise increases. Moreover, if the collection or set of instructions that make up the test case is comparatively small, so that test case execution time is short, the test case generation time will frequently outweigh the test case execution time. This gap between test case generation and execution times widens, as the processor being tested is run through an increasing number of loops.

It would thus be beneficial to provide a method and system for processor testing, wherein the time required for test case generation is significantly reduced, relative to test case execution time. This would improve the over-all efficiency of the design verification procedure.

BRIEF SUMMARY OF THE INVENTION

The invention is generally directed to a method, apparatus and computer program product for use in a system that includes one or more processors, and further includes multiple threads that are respectively associated with the one or more processors. One embodiment of the invention is directed to a method that comprises the steps of generating one or more test cases, wherein each test case comprises a specified set of instructions in a specified order, and defining a plurality of thread hardware allocations, corresponding to different ones of the threads. The thread hardware allocation corresponding to a given thread comprises a set of processor hardware resources that are allocated to the given thread for use in executing test cases. The method further includes executing a particular one of the test cases on a first thread hardware allocation, in order to provide a first set of test data, and thereafter executing the particular test case using a second thread hardware allocation, in order to provide a second set of test data.

DETAILED DESCRIPTION OF THE INVENTION

Figure 1:
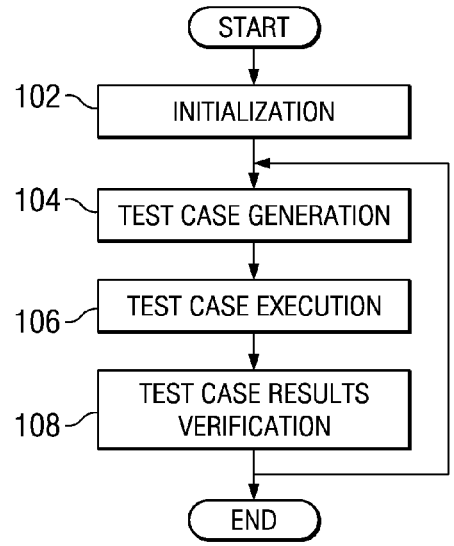
FIG. 1 is a schematic diagram illustrating respective steps of a processor testing procedure that uses an embodiment of the invention.

Referring to FIG. 1, there is shown a flowchart depicting principal steps or routines of a microprocessor testing procedure, according to an embodiment of the invention. The procedure is commenced by initialization, at step 102. A test case is generated at step 104, and is then executed at step 106, as described hereinafter in further detail. Generally, a test case is sequentially executed by different threads of the processor, before another test case is generated, in order to produce multiple processor hardware test results. The results are verified at step 108, and the procedure either ends, or else returns to generation step 104. As likewise further described hereinafter, execution of a test case by a processor thread more specifically means execution of the test case by particular processor hardware that has been allocated to the thread.

Figure 2:
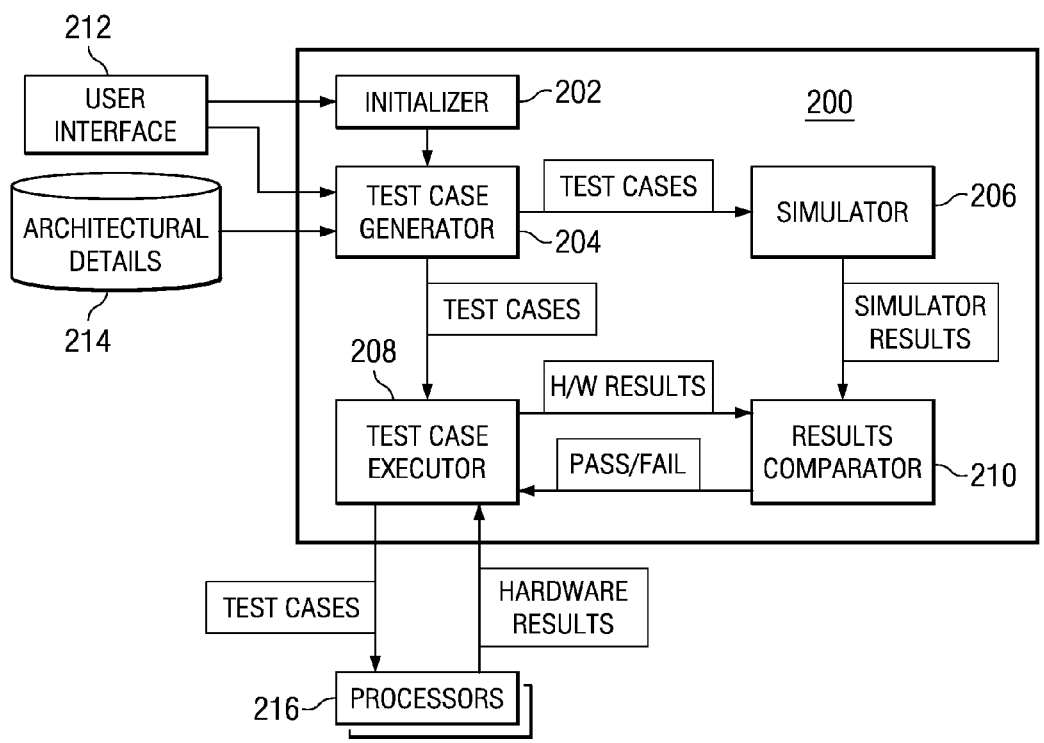
FIG. 2 is a block diagram showing a system for carrying out a processor testing procedure in accordance with an embodiment of the invention.

Referring to FIG. 2, there is shown a generation/tester component 200 that may be used to implement the processor testing procedure of FIG. 1. More particularly, generator/tester component 200 is configured to generate test cases, receive back hardware test results, and then compare the hardware test results against simulated results that are intended or expected. The over-all procedure provides processor design verification and validation. Generator/tester 200 includes an initializer 202, a test case generator 204, a simulator 206, a test case executor 208, and a results comparator 210. A user interface 212 provides user inputs to initializer 202 and test case generator 204, such as types of instructions to execute, memory range, the number of instructions to build into a test case, and the order of the instructions. In turn, initializer 202 provides initialization information to test case generator 204. A simple illustration of a test case could be the instructions ori r15,r15,0xf, stwx r20,r5,r16, and fmadd. f27,f20,f31, which are to be executed sequentially in order. More generally, a test case could comprise a sequence of instructions of any reasonable length selected from instruction classes such as VMX, floating point, fixed point and load/store instructions.

Test case generator 204 uses the initialization information, along with architectural rules from architectural details 214, to generate test cases for one or a plurality of processors 216. The architectural details pertain to processor design and the respective capabilities thereof. Test case generator 204 provides the test cases to simulator 206 and also to test case executor 208. Test case executor 208 dispatches respective test cases to processor 216, as described hereinafter in further detail. The processor then executes the test cases to produce hardware test results, and the hardware results are sent back to test case executor 208.

Test case executor 208 in turn furnishes the hardware results to results comparator 210, which compares the hardware results with simulation results generated by simulator 206. Comparator 210 then informs test case executor 208 as to whether the hardware results match the simulation results (pass/fail). Thereafter, test case executor 208 dispatches further test cases to processor 216. In one embodiment, test case executor 208 resides on a processor 216.

Figure 3:
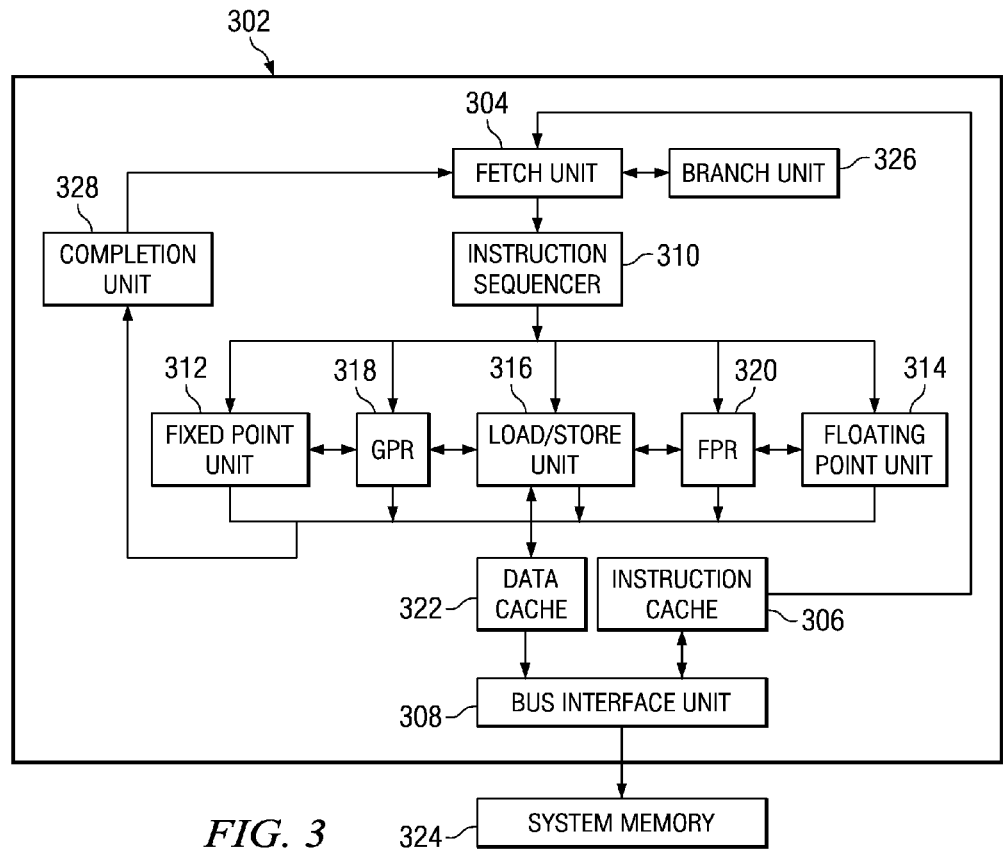
FIG. 3 is a block diagram showing a simplified microprocessor, of a type which may be tested using embodiments of the invention.

Referring to FIG. 3, there is shown a generalized Central Processing Unit (CPU) or microprocessor 302, which may comprise one of the processors 216 shown in FIG. 2. However, the invention is by no means limited thereto. Processor 302 includes a fetch unit 304 connected to fetch or obtain instructions from an instruction cache 306, which is coupled to exchange instruction related information with a bus interface unit 308. An instruction sequencer 310 is connected to fetch unit 304, to arrange respective received instructions in an instruction issue queue. The issue queue determines the sequence or order in which sequencer 310 issues each instruction to an execution unit corresponding to the instruction. Certain preliminary tasks or operations, that must be performed with respect to some of the instructions before they issue, are also carried out at the instruction sequencer 310.

Referring further to FIG. 3, there are shown instruction execution units including a fixed point unit 312, a floating point unit 314, and a load/store unit 316. Fixed point unit 312 is generally configured to execute all integer arithmetic, logical operations, shifts, rotates, compares and traps. Floating point unit 314 is a dedicated execution unit designed for performing mathematical functions on floating point numbers, that is, any number other than an integer. The load/store unit 316 executes all load instructions and store instructions. A store instruction can be used to cause a data entry in general purpose register (GPR) 318 or floating point register (FPR) 320 to be read, and then moved through data cache 322 to system memory 324. A load instruction can cause a data entry to be loaded into FPR 320, for use in performing an operation required by an instruction executed by floating point unit 316.

FIG. 3 further shows processor 302 provided with a branch unit 326 connected to fetch unit 304, and a completion unit 328 connected between the execution units and fetch unit 304. Units 326 and 328 generally operate in a conventional manner. If branch unit 326 determines that an instruction received by fetch unit 304 is a branch instruction, it will act to replace the branch instruction with instructions located at the branch destination.

As is known by those of skill in the art, a computer program or process can comprise a number of threads, wherein multiple threads can execute different instructions in parallel on a computer processor. Moreover, a set or configuration of hardware resources of the processor must be allocated or assigned to each thread, for use in executing successive instructions associated with the thread.

In a processor that supports multithreading, some of the hardware resources may be shared with other threads, while other resources are not shared. For example, routes to functional units are shared by different threads, whereas register files may not be shared. Thus, floating point instructions of thread 0 might always get sent to a floating point unit 0, while floating point instructions of thread 1 would be sent to a floating point unit 1. Herein, the set of all processor hardware resources that are allocated to a particular thread, including both shared and non-shared resources, are referred to as the thread hardware allocation for the particular thread. In processor 302 shown in FIG. 3, hardware resources that could be allocated to different threads, in addition to the fixed point and floating point units, may include fetch unit 304, instruction sequencer 310, load/store unit 316 and files of registers 318 and 320.

It follows from the above that when a test case is to be executed by a particular thread in a multithread processor, respective instructions of the test case will be executed by the processor hardware resources comprising the thread hardware allocation for the particular thread. Accordingly, execution of the test case produces a set of hardware test data or test results, as described above in connection with FIGS. 1 and 2, wherein the test data pertains specifically to operation of the processor hardware of such thread hardware allocation. Moreover, if the same test case is executed by a second thread, different hardware test data can be provided, since the thread hardware allocation is likely to be different for the second thread.

Figure 4:
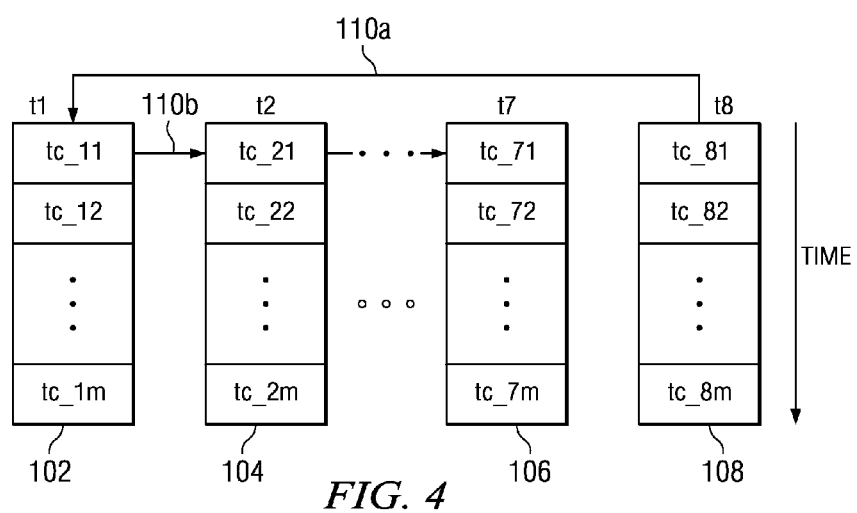
FIG. 4 is a schematic diagram showing a group of thread hardware allocations, for use in illustrating an embodiment of the invention.

Referring to FIG. 4, there is shown a number of thread hardware allocations 102-108, of the type described above. The allocations 102-108 respectively correspond to threads t1, t2, t7 and t8, which each comprises one of N threads used in processing by a multithread processor, such as processor 302 shown in FIG. 3. The number of threads N can be any reasonable number, but is shown to be 8 in FIG. 4 for purposes of illustration.

In a useful embodiment, each of the threads t1-t8 of FIG. 4 initially generates a test case, and then executes it. Thus, thread t1 generates a test case tc_11, and threads t2, t7 and t8 generate tests cases tc_21, tc_71, and tc_81, respectively. Then, test case tc_11 is executed on thread hardware allocation 102, corresponding to thread t1, thereby producing test results for the processor hardware included in such hardware allocation. At the same time, test cases tc_21, tc_71 and tc_81, are executed on thread hardware allocations 104-108, respectively, to likewise produce respectively corresponding hardware test results.

Referring further to FIG. 4, immediately following the initial round of test case executions, tc_11 generated by thread t1 is shifted to the adjacent thread hardware allocation 104, corresponding to thread t2, as shown by a shift path 110*a*. Each of the other test cases is likewise shifted to an adjacent thread hardware allocation, along shift paths such as 110*b*. test case tc_21 is thereby shifted to the allocation corresponding to thread t3 (not shown), and test case tc_81 is shifted to thread hardware allocation 102. Thread hardware allocation 106, corresponding to thread t7, receives a test case from thread t6 (not shown).

Following the shift operations, each thread uses its corresponding thread hardware allocation to execute its newly received test case. For example, t1 executes test case tc_81 on thread hardware allocation 102. It will be seen that this second round of test case executions produces a further batch or set of hardware test results, for the respective thread hardware allocations of threads t1-t8. However, it was not necessary to generate any new test cases, in order to acquire this additional test data.

After completion of the shift and execution cycle described above, a succession of further shift and execution cycles is carried out, with each test case being shifted from a thread hardware allocation to the next adjacent allocation, as represented by FIG. 4, for execution by the thread corresponding to such next adjacent allocation. This procedure continues, until all eight of the test cases tc_11-tc_81 have been executed by each of the processor threads t1-t8. After the entire succession of shift and execution cycles has been completed, and only thereafter, each of the threads t1-t8 generates another test case, e.g., tc_12, tc_22, tc_72, and tc_82, respectively, as shown by FIG. 4. A succession of shift and execution cycles as described above is then commenced for these test cases. At the mth succession, test cases such as tc_1m-tc_8m are generated.

It will be appreciated that the procedure described above enables a substantial amount of hardware test data to be produced for a processor design verification effort or the like. At the same time, reusing test cases on multiple thread allocations, as described above, substantially reduces the time required for test case generation, and thus makes the generation-to-execution time ratio significantly smaller. Moreover, due to the interaction between the threads, cores and nodes in a multi-core microprocessor design, running the same test case on multiple threads individually can provide very effective test results. As stated above, executing the same test case on different thread hardware allocations tends to produce different results. With the above procedure, a test case is shifted or rippled through some or all threads of all of the cores that the system under test is running.

In a variation of the embodiment shown in FIG. 4, test cases can be shifted among thread hardware allocations on a random basis, rather than according to a fixed pattern. As an example of this variation, referred to as a permutation, thread t1 could successively execute the test cases (tc_11, tc_41, tc_81, tc_21, tc_61, tc_31, tc_51, and tc_71).

In a further variation that is even more random, each thread generates a test case and executes it. Then, each of the test cases is placed into a pool. Subsequently, each thread randomly selects test cases from the pool, with the possibility of reusing a test case. Thus, thread t1 could successively execute the test cases (tc_11, tc_41, tc_61, tc_31, tc_41, tc_21, tc_51, and tc_81), with tc_41 being executed twice.

In yet another variation, each thread selects a subset of the test cases generated by other threads, and executes those test cases instead of the entire set of generated test cases. For example thread t1 could execute (tc_11, tc_51, and tc_31).

Figure 5:
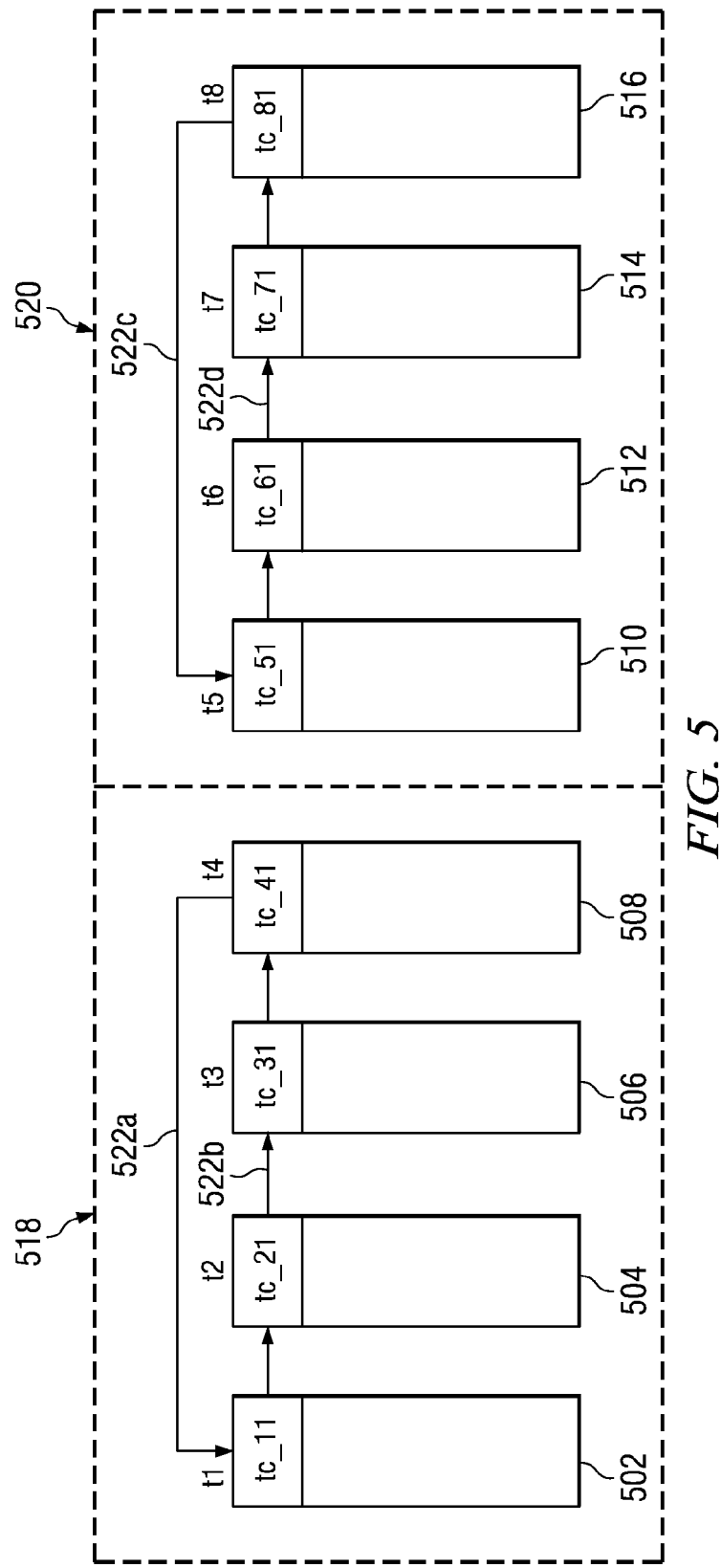
FIG. 5 is a schematic diagram showing a modification of the embodiment of FIG. 4.

Referring to FIG. 5, there is shown a modification of FIG. 4, wherein threads t1-t8, with their respectively corresponding thread hardware allocations 502-516, are partitioned into two groups 518 and 520. In this approach, only the test cases generated by threads t1-t4, comprising group 518, are shifted or rippled among the threads of group 518 and executed by the hardware configurations thereof. Similarly, only the test cases generated by threads t5-t8, comprising group 520, are shifted among the threads of group 520 and executed by the hardware configurations thereof. Test cases are respectively shifted along shift paths such as 522a-d.

In a variation of the partitioning approach shown in FIG. 5, the threads t1-t8 would again be partitioned into two groups, and test cases would again be shifted only among the thread hardware configurations of one of the groups. However, the groups would be more randomly formed, for example, by placing threads t1, t3, t5 and t6 into a first group, and placing threads t2, t4, t7 and t8 into a second group.

In other embodiments of the invention, respective test cases may be executed by different threads in an order related to the interconnect topology of processors in the system.

Figure 6:
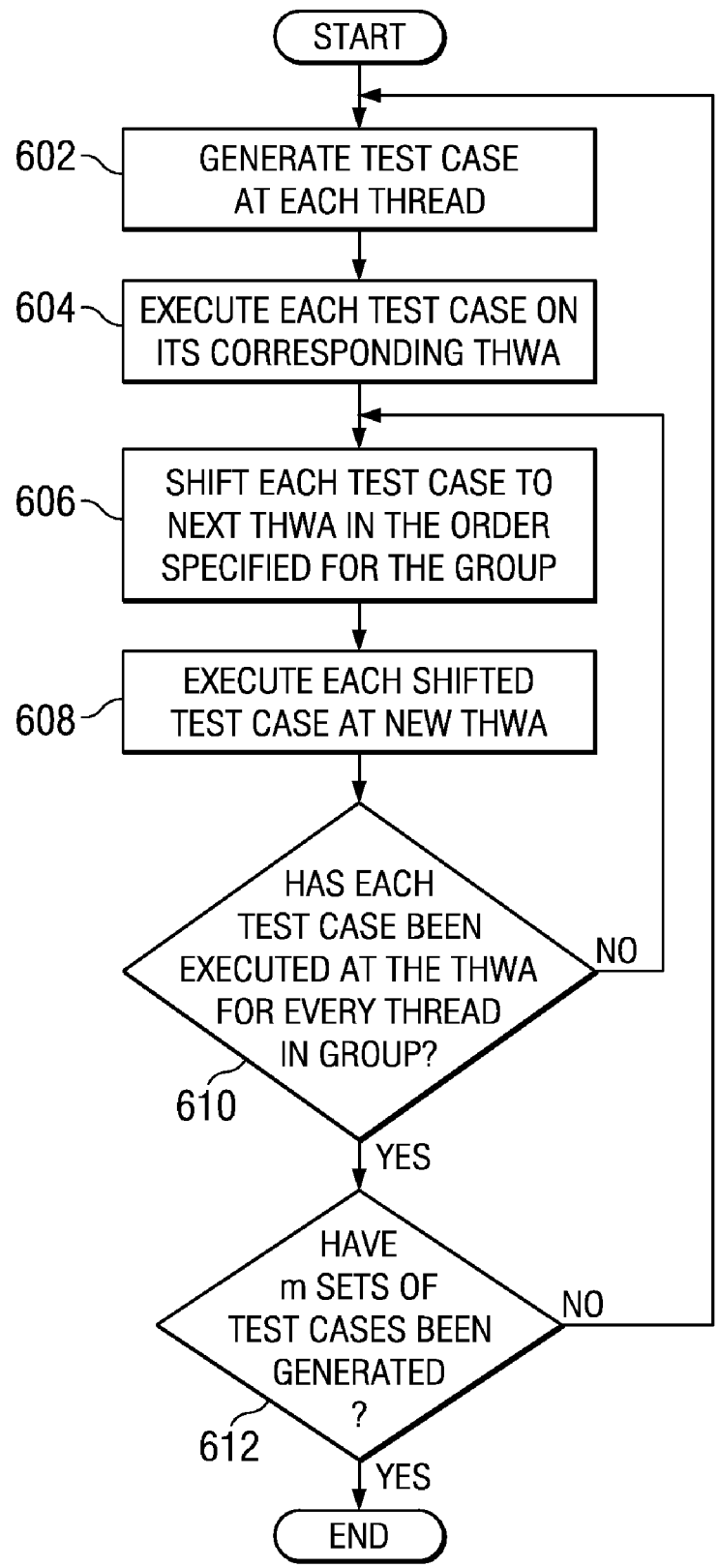
FIG. 6 is a flowchart showing principal steps for a method comprising an embodiment of the invention.

Referring to FIG. 6, there are shown principal steps of a procedure such as the procedure of FIG. 4, or a variation thereof. Such procedure pertains to a group that includes a prespecified number of threads, wherein each thread has a corresponding thread hardware allocation (THWA). In addition, test cases are to be shifted from the thread hardware allocation of one thread to the hardware allocation of another thread, in a prespecified order or pattern. It is also intended to generate and execute a total of m sets of test cases, in order to provide sufficient test results for design verification.

At step 602, a test case is generated by each thread, and at step 604 each generated test case is executed on the thread hardware allocation of its thread. At steps 606 and 608, each test case is shifted or rippled to the next thread hardware allocation, according to the prespecified shift order, and is then executed thereby.

At step 610, it is necessary to determine whether or not each test case has been executed with respect to every thread in the group. If not, the procedure returns to step 606, and again shifts each test case to its next thread hardware allocation, as specified by the shift order. On the other hand, if the query of step 610 is affirmative, it is necessary to determine whether all m test cases have been generated. If so, the procedure ends, and if not it returns to step 602.

Figure 7:
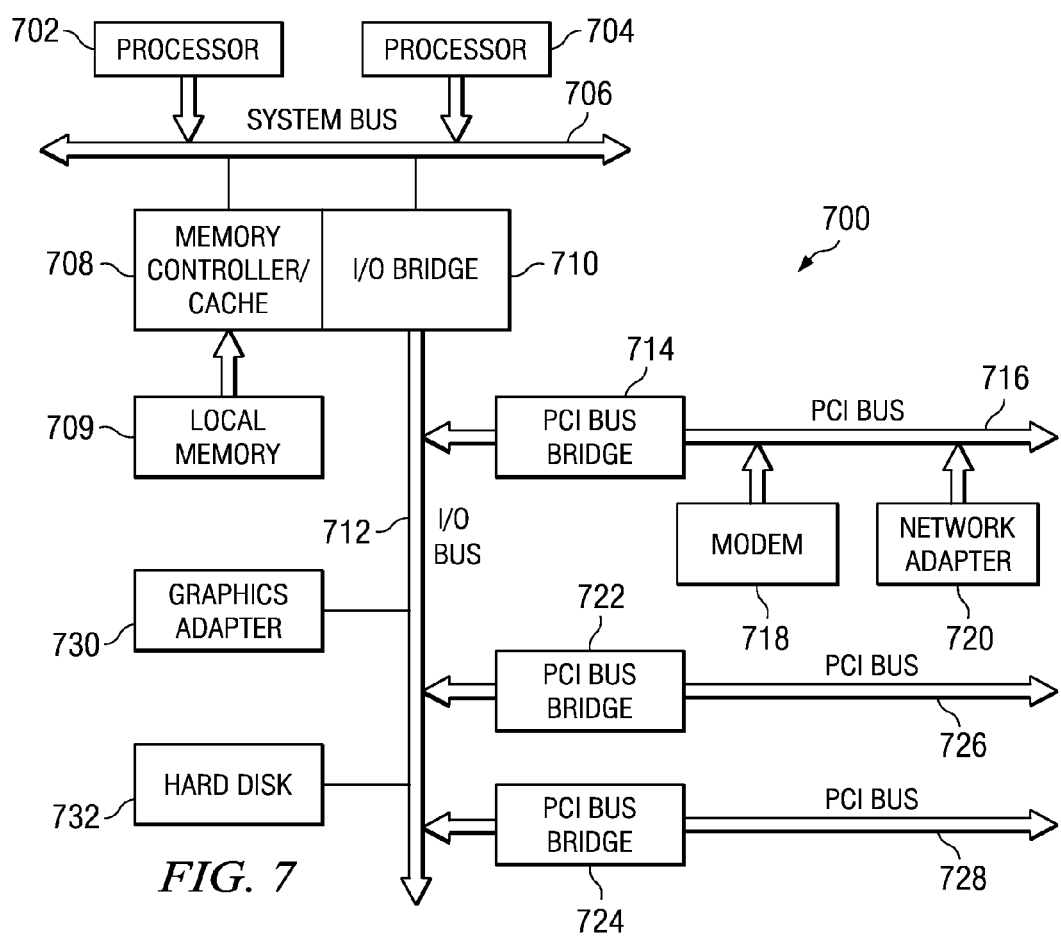
FIG. 7 is a block diagram showing a computer or data processing system that may be used in implementing embodiments of the invention.

Referring to FIG. 7, there is shown a data processing system 700 that may be used in implementing embodiments of the present invention. Data processing system 700 may be a symmetric multiprocessor (SMP) system including a plurality of processors 702 and 704 connected to system bus 706. Alternatively, a single processor system may be employed. Also connected to system bus 706 is memory controller/cache 708, which provides an interface to local memory 709. I/O bus bridge 110 is connected to system bus 706 and provides an interface to I/O bus 712. Memory controller/cache 708 and I/O bus bridge 710 may be integrated as depicted.

Peripheral component interconnect (PCI) bus bridge 714 connected to I/O bus 712 provides an interface to PCI local bus 716. A number of modems such as modem 718 may be connected to PCI bus 716. Typical PCI bus implementations will support four PCI expansion slots or add-in connectors. Communications links to network computers may be provided through modem 718 and network adapter 720 connected to PCI local bus 716 through add-in boards.

Additional PCI bus bridges 722 and 724 provide interfaces for additional PCI buses 726 and 728, from which additional modems or network adapters may be supported. In this manner, system 700 allows connections to multiple network computers. The replication of systems and connections among them may be used to form a collection of interconnected distributed systems such as those comprising distributed directory services servers in accordance with an embodiment of the present invention. A memory mapped graphics adapter 730 and hard disk 732 may also be connected to I/O bus 712 as depicted, either directly or indirectly.

Those of ordinary skill in the art will appreciate that the hardware depicted in FIG. 7 may vary. For example, other peripheral devices, such as optical disk drives and the like also may be used in addition or in place of the hardware depicted. The depicted example is not meant to imply architectural limitations with respect to the present invention.

The data processing system depicted in FIG. 7 may be, for example, an IBM RISC/System 6000 system, a product of International Business Machines Corporation in Armonk, N.Y., running the Advanced Interactive Executive (AIX) operating system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a system including one or more processors and multiple threads that are respectively associated with the one or more processors, a computer implemented method for using test cases in processor testing, wherein said method comprises the steps of:
   generating one or more test cases, wherein each test case comprises a specified set of instructions in a specified order;
   defining a plurality of thread hardware allocations, corresponding to different ones of said threads, wherein the thread hardware allocation corresponding to a given thread comprises a set of processor hardware resources allocated to said given thread for use in executing test cases; and
   executing a particular one of said test cases on a first thread hardware allocation, in order to provide a first set of test data, and thereafter executing said particular test case on a second thread hardware allocation, in order to provide a second set of test data.

2. The method of claim 1, wherein:
   a different test case is generated by each of said threads, wherein the test case generated by a given thread is first executed on the thread hardware allocation corresponding to said given thread, and is then shifted to a different hardware thread allocation and executed thereon, wherein each of said executions provides a set of test data associated with operation of said one or more processors.

3. The method of claim 1, wherein:
   each thread in a group comprising N of said threads initially generates one of N test cases, and thereafter each of said N threads successively executes a plurality of said N test cases on its thread hardware allocation.

4. The method of claim 3, wherein:
   each of said N threads generates a new test case only after executing a specified plurality of said N test cases.

5. The method of claim 3, wherein:
   each of said N test cases is executed on the thread hardware allocation corresponding to each of said N threads.

6. The method of claim 3, wherein:
   after execution on one thread hardware allocation, one of said N test cases is shifted to another thread hardware allocation for execution, in accordance with a prespecified shift pattern.

7. The method of claim 1, wherein:
   a number of said test cases are placed into a pool, and each of said threads randomly selects test cases from said pool for execution on its corresponding thread hardware allocation.

8. The method of claim 1, wherein:
   said method includes selectively processing said first and second sets of test data, in order to verify specified characteristics of said one or more processors.

9. The method of claim 8, wherein:
   said test data is compared with data representing expected characteristics of said one or more processors.

10. In a system including one or more processor and multiple threads that are respectively associated with one or more processors, a computer program product stored on a computer readable storage medium for executing test cases in processor testing, wherein said computer program product comprises:
   instructions for generating one or more test cases, wherein each test case comprises a specified set of instructions in a specified order;
   instructions for defining a plurality of thread hardware allocations, corresponding to different ones of said threads, wherein the thread hardware allocation corresponding to a given thread comprises a set of processor hardware resources allocated to said given thread for use in executing test cases; and
   instructions for executing a particular one of said test cases on a first thread hardware allocation, in order to provide a first set of test data, and thereafter executing said particular test case on a second thread hardware allocation, in order to provide a second set of test data.

11. The computer program product of claim 10, wherein:
a different test case is generated by each of said threads, wherein the test case generated on a given thread is first executed on the thread hardware allocation corresponding to said given thread, and is then shifted to a different hardware thread allocation and executed thereon, wherein each of said executions provides a set of test data associated with operation of said one or more processors.

12. The computer program product of claim 10, wherein:
each thread in a group comprising N of said threads initially generates one of N test cases, and thereafter each of said N threads successively executes a plurality of said N test cases on its thread hardware allocation.

13. The computer program product of claim 12, wherein:
each of said N threads generates a new test case only after executing a specified plurality of said N test cases.

14. The computer program product of claim 12, wherein:
each of said N test cases is executed on the thread hardware allocation corresponding to each of said N threads.

15. The computer program product of claim 3, wherein:
after execution on one thread hardware allocation, one of said N test cases is shifted to another thread hardware allocation for execution, in accordance with a prespecified shift pattern.

16. In a system including one or more processors and multiple threads that are respectively associated with the one or more processors, apparatus for using test cases in processor testing, wherein said apparatus comprises:
a bus;
a communications unit connected to the bus;
a memory connected to the bus, wherein the memory includes a set of computer usable program code; and
a processor unit connected to the bus, wherein the processor unit executes the set of computer usable program code to:
generate one or more test cases, wherein each test case comprises a specified set of instructions in a specified order;
define a plurality of thread hardware allocations, corresponding to different ones of said threads, wherein the thread hardware allocation corresponding to a given thread comprises a set of processor hardware resources allocated to said given thread for use in executing test cases; and
execute a particular one of said test cases on a first thread hardware allocation, in order to provide a first set of test data, and thereafter executing said particular test case on a second thread hardware allocation, in order to provide a second set of test data.

17. The apparatus of claim 16, wherein:
a different test case is generated by each of said threads, wherein the test case generated on a given thread is first executed on the thread hardware allocation corresponding to said given thread, and is then shifted to a different hardware thread allocation and executed thereon, wherein each of said executions provides a set of test data associated with operation of said one or more processors.

18. The apparatus of claim 16, wherein:
each thread in a group comprising N of said threads initially generates one of N test cases, and thereafter each of said N threads successively executes a plurality of said N test cases on its thread hardware allocation.

19. The apparatus of claim 18, wherein:
each of said N threads generates a new test case only after executing a specified plurality of said N test cases.

20. The apparatus of claim 16, wherein:
said apparatus includes a comparator for comparing said test data with data representing expected characteristics of said one or more processors.

* * * * *